United States Patent
Moussaoui et al.

(10) Patent No.: US 10,770,921 B2
(45) Date of Patent: Sep. 8, 2020

(54) WIRELESS CHARGING SYSTEM WITH START-UP NEGOTIATION

(71) Applicant: Apple Inc., Cupertino, CA (US)

(72) Inventors: Zaki Moussaoui, San Carlos, CA (US); Weihong Qiu, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 15/883,415

(22) Filed: Jan. 30, 2018

(65) Prior Publication Data

US 2018/0233956 A1    Aug. 16, 2018

Related U.S. Application Data

(60) Provisional application No. 62/457,727, filed on Feb. 10, 2017.

(51) Int. Cl.
| | |
|---|---|
| *H01M 10/46* | (2006.01) |
| *H02J 50/12* | (2016.01) |
| *H02J 50/40* | (2016.01) |
| *H02J 7/02* | (2016.01) |
| *H02J 50/80* | (2016.01) |
| H02J 7/00 | (2006.01) |

(52) U.S. Cl.
CPC .............. *H02J 50/12* (2016.02); *H02J 7/025* (2013.01); *H02J 50/40* (2016.02); *H02J 50/80* (2016.02); *H02J 7/00045* (2020.01)

(58) Field of Classification Search
CPC .......... H02J 7/0042; H02J 50/10; H02J 50/12; H02J 50/20; H02J 50/60; H02J 50/80
USPC .................................. 320/108, 109, 128, 141
See application file for complete search history.

(56) References Cited

U.S. PATENT DOCUMENTS

| | | |
|---|---|---|
| 9,209,627 B2 | 12/2015 | Baarman et al. |
| 2010/0066305 A1 | 3/2010 | Takahashi et al. |
| 2012/0161539 A1 | 6/2012 | Kim et al. |
| 2013/0221915 A1 | 8/2013 | Son et al. |
| 2013/0288600 A1 | 10/2013 | Kuusilinna et al. |
| 2014/0009109 A1 | 1/2014 | Lee et al. |
| 2014/0094116 A1 | 4/2014 | Walley et al. |
| 2015/0130412 A1 | 5/2015 | Partovi |

(Continued)

FOREIGN PATENT DOCUMENTS

| | | |
|---|---|---|
| CN | 103368270 A | 10/2013 |
| CN | 104167829 A | 11/2014 |
| JP | 5995022 B1 | 9/2016 |

*Primary Examiner* — Edward Tso
(74) *Attorney, Agent, or Firm* — Treyz Law Group, P.C.; G. Victor Treyz; Jason Tsai

(57) ABSTRACT

A wireless power transmission system has a wireless power receiving device that is located on a charging surface of a wireless power transmitting device. The wireless power transmitting device uses measurement circuitry such as coil impedance measurement circuitry or impulse-response circuitry that makes coil inductance measurements to monitor the charging surface for the presence of the wireless power receiving device. In response to detecting that the wireless power receiving device is present on the charging surface, the wireless power transmitting device and the wireless power receiving device establish a wireless communications link. The wireless power transmitting device transmits information on wireless power transmission capabilities of the wireless power transmitting device to the wirelessly power receiving device. The receiving device selects desired settings and transmits these to the transmitting device.

20 Claims, 6 Drawing Sheets

(56) References Cited

U.S. PATENT DOCUMENTS

| | | |
|---|---|---|
| 2015/0285926 A1 | 10/2015 | Oettinger |
| 2015/0321567 A1 | 11/2015 | Czainski |
| 2015/0365136 A1 | 12/2015 | Miller et al. |
| 2016/0134154 A1 | 5/2016 | Baarman et al. |
| 2017/0237296 A1 | 8/2017 | Keith et al. | ual patent application No. 62/457,727, filed Feb. 10, 2017, which is hereby incorporated by reference herein in its entirety.

WIRELESS CHARGING SYSTEM WITH START-UP NEGOTIATION

This application claims the benefit of provisional patent application No. 62/457,727, filed Feb. 10, 2017, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to a portable electronic device. The portable electronic device receives the wirelessly transmitted power and uses this power to charge an internal battery and to power components in the portable electronic device.

SUMMARY

It can be challenging to regulate the flow of wireless power in a wireless charging system. For example, in a wireless charging system having adjustable operating settings, it can be difficult to determine which settings to use to effectively transmit wireless power to an electronic device.

A wireless power transmission system has a wireless power receiving device that is received on a charging surface of a wireless power transmitting device. The wireless power transmitting device uses measurement circuitry such as coil impedance measurement circuitry or impulse-response circuitry that makes coil inductance measurements to monitor the charging surface for the presence of the wireless power receiving device. In response to detecting that the wireless power receiving device is present on the charging surface, the wireless power transmitting device and the wireless power receiving device establish a wireless communications link.

Using the communications link, the wireless power transmitting device transmits information on wireless power transmission capabilities of the wireless power transmitting device to the wirelessly power receiving device. The transmitted information includes, e.g., minimum and maximum duty cycle settings, wireless power transmission power modulation scheme settings information such as one or more power modulation scheme settings (e.g., a pulse width modulation scheme setting, an amplitude modulation scheme setting, a phase shift modulation scheme setting, etc.), a wireless power transmission sleep timer setting, a wireless power transmission frequency setting, power limits and thresholds, and/or other wireless power transmission settings supported by the transmitting device.

The receiving device uses sensor readings, battery charge state information, and information on which components are active in the receiving device to select desired operating settings. The receiving device transmits the selected settings to the wireless power transmitting device over the wireless communications link.

The information transmitted to the transmitting device by the receiving device includes, e.g., minimum and maximum duty cycle settings, wireless power transmission power modulation scheme settings information such as one or more power modulation scheme settings (e.g., a pulse width modulation scheme setting, an amplitude modulation scheme setting, a phase shift modulation scheme setting, etc.), a wireless power transmission sleep timer setting, a wireless power transmission frequency setting, power limits and thresholds, and/or other wireless power transmission settings for use by the wireless power transmitting device.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, electronic equipment storage case, remote control, laptop computer, other portable electronic device, or other wireless power receiving equipment.

During operation, the wireless power transmitting device supplies alternating-current drive signals to one or more wireless power transmitting coils in an array of coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
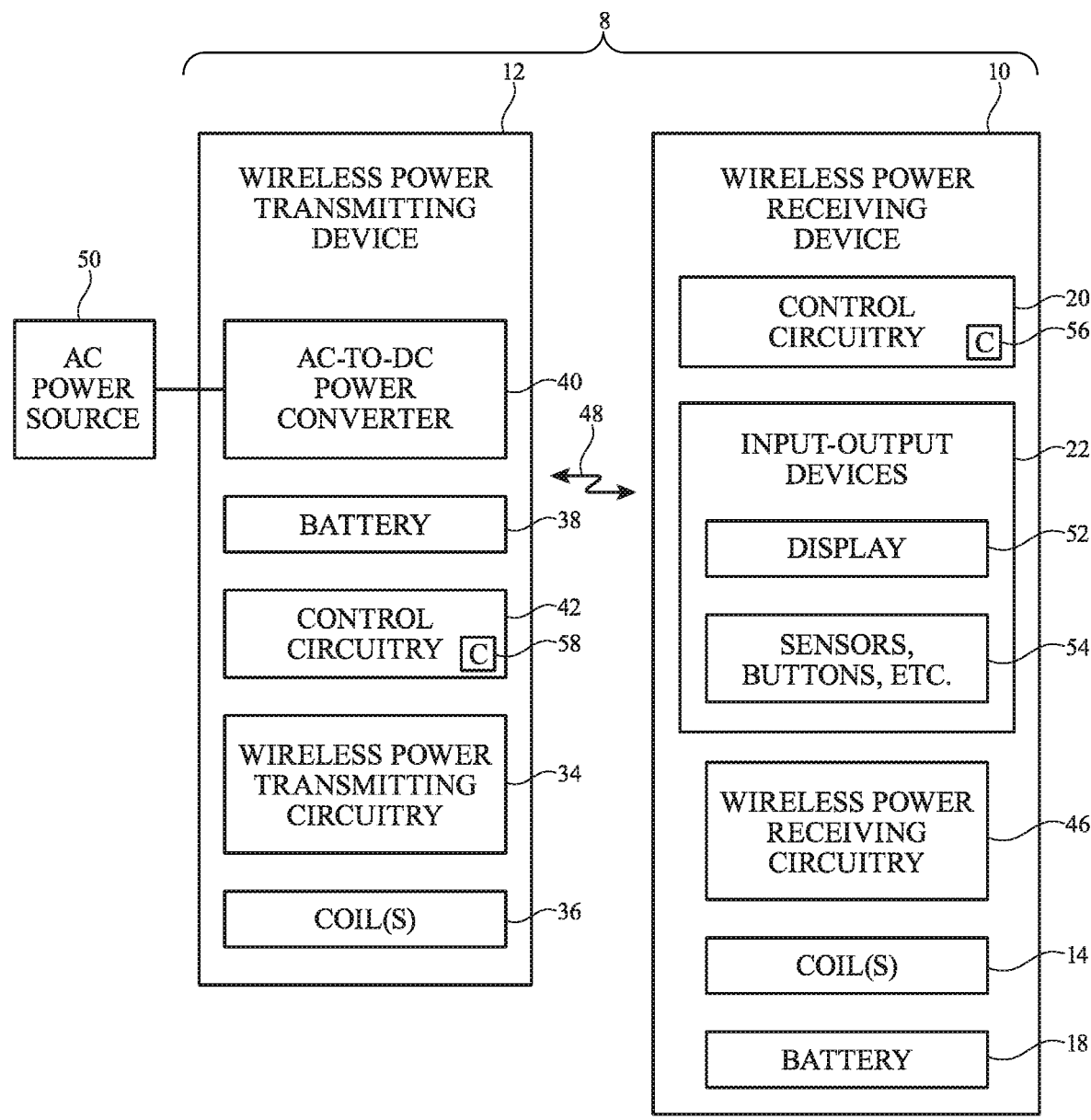
FIG. 1 is a schematic diagram of an illustrative wireless charging system in accordance with embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations are sometimes be described herein as examples.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as alternating-current-to-direct current (AC-DC) power converter 40 can convert power from a mains power source or other alternating-current (AC) power source into direct-current (DC) power that is used to power control circuitry 42 and other circuitry in device 12. During operation, control circuitry 42 uses wireless power transmitting circuitry 34 and one or more coil(s) 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC signals (drive signals) through coil(s) 36. As the AC signals pass through coil(s) 36, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from coil(s) 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with corresponding wireless communications circuitry 58 in control circuitry 42 of wireless power transmitting device 12 and/or other equipment, audio components, and other components (e.g., input-output devices 22 and/or control circuitry 20) and are used in charging an internal battery in device 10 such as battery 18.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using sensing circuitry to measure coil inductances and other parameters, processing measured inductance values, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, minimum and maximum duty cycle settings, coil settings (e.g., which coils are active and weights for active coils) in a multi-coil array, wireless power transfer modulation scheme settings (e.g., one or more desired modulation schemes and power thresholds associated with switching between these scheme(s)), wireless charging sleep interval settings, and wireless power transmission levels, and performing other control functions. Control circuitry 42 and 20 may be configured to support wireless communications between devices 12 and 10 (e.g., control circuitry 20 may include wireless communications circuitry such as circuitry 56 and control circuitry 42 may include wireless communications circuitry such as circuitry 58). Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly over a wireless communications link established during operation of system 8. Devices 10 and 12 may, for example, have wireless transceiver circuitry in control circuitry 20 and 42 (see, e.g., wireless communications circuitry such as circuitry 56 and 58 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

Figure 2:
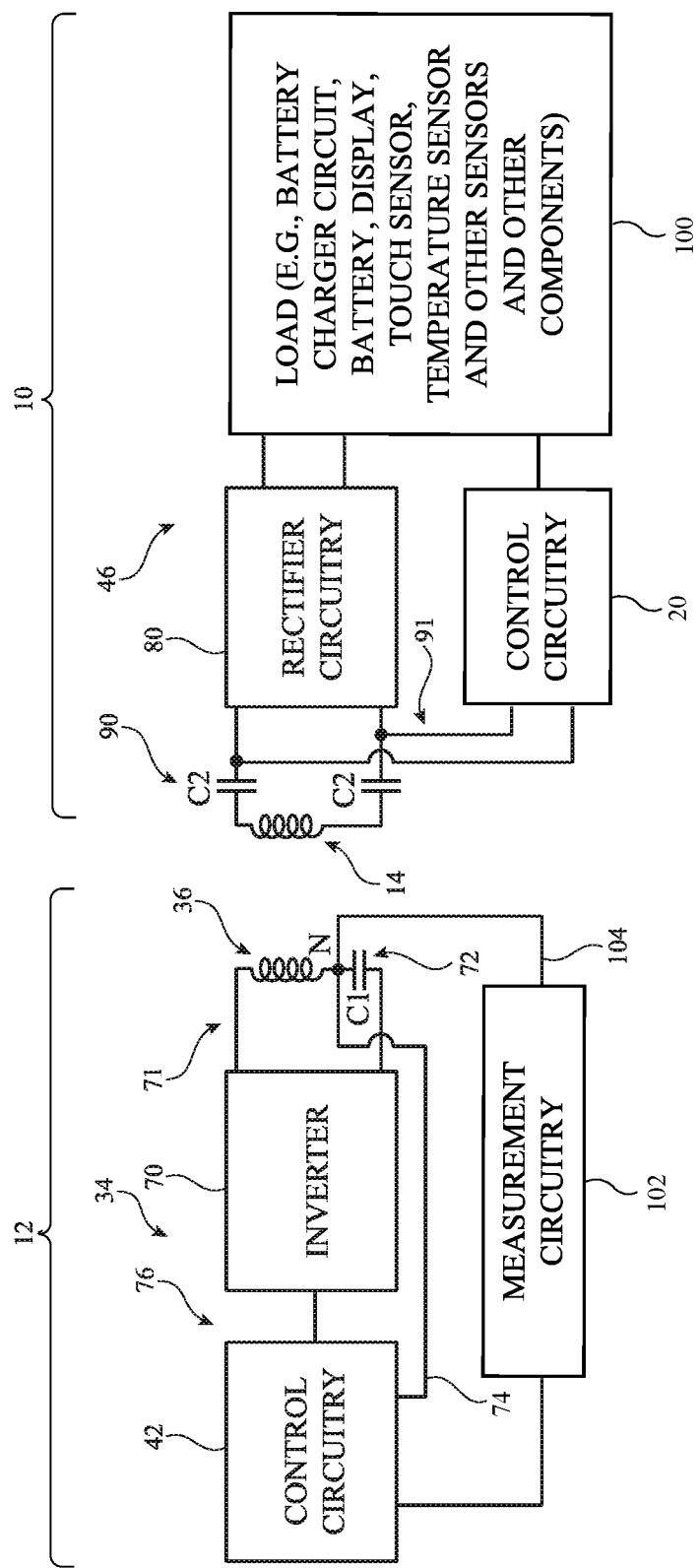
FIG. 2 is a circuit diagram of an illustrative wireless charging system in accordance with an embodiment.

A circuit diagram of illustrative circuitry for wireless power transfer (wireless power charging) system 8 is shown in FIG. 2. As shown in FIG. 2, wireless power transmitting circuitry 34 includes an inverter such as inverter 70 or other drive circuit that produces alternating-current drive signals such as variable-duty-cycle square waves or other drive signals for implementing a pulse width modulation (PWM) power modulation scheme, variable amplitude square waves or other drive signals for implementing an amplitude modulation (AM) power modulation scheme, or phase-shift modulated drive signals for implementing a phase shift power modulation scheme (as examples). These signals are driven through an output circuit such as output circuit 71 that includes coil(s) 36 and capacitor(s) 72 to produce wireless power signals that are transmitted wirelessly to device 10.

Coil(s) 36 are electromagnetically coupled with coil(s) 14. A single coil 36 and single corresponding coil 14 are shown in the example of FIG. 2. In general, device 12 may have any suitable number of coils (1-100, more than 5, more than 10, fewer than 40, fewer than 30, 5-25, etc.) and device 10 may have any suitable number of coils. Switching circuitry (sometimes referred to as multiplexer circuitry) that is controlled by control circuitry 42 can be located before and/or after each coil (e.g., before and/or after each coil 36 and/or before and/or after the other components of output circuit 71 in device 12 to couple the inverter of output circuit 71 to the array) and can be used to switch desired sets of one or more coils (e.g., coils 36 and output circuits 71 in device 12) into or out of use. For example, if it is determined that device 10 is located in a position that overlaps a particular coil 36 in device 12, the coil 36 overlapping device 10 may be activated during wireless power transmission operations while other coils 36 (e.g., coils not overlapped by device 10 in this example) are turned off.

Control circuitry 42 and control circuitry 20 contain wireless transceiver circuits (e.g., circuits such as wireless communication circuitry 56 and 58 of FIG. 1) for supporting wireless data transmission between devices 12 and 10. In device 10, control circuitry 20 (e.g., communications circuitry 56) can use path 91 and coil 14 to transmit data to device 12. In device 12, paths such as path 74 may be used to supply incoming data signals that have been received from device 10 using coil 36 to demodulating (receiver) circuitry in communications circuitry 58 of control circuitry 42. If desired, path 74 may be used in transmitting wireless data to device 10 with coil 36 that is received by receiver circuitry in circuitry 56 of circuitry 20 using coil 14 and path 91. Configurations in which circuitry 56 of circuitry 20 and circuitry 58 of circuitry 42 have antennas that are separate from coils 36 and 14 may also be used for supporting unidirectional and/or bidirectional wireless communications between devices 12 and 10, if desired.

During wireless power transmission operations, transistors (switches) in inverter 70 are controlled using AC control signals from control circuitry 42. Control circuitry 42 uses control path 76 to supply control signals to the gates of the transistors in inverter 70. The duty cycle and/or other attributes of these control signals and therefore the corresponding characteristics of the drive signals applied by inverter 70 to coil 36 and the corresponding wireless power signals produced by coil 36 can be adjusted dynamically. Using switching circuitry, control circuitry 42 selects which coil or coils to supply with drive signals. Using duty cycle adjustments and/or other adjustments (e.g., drive frequency adjustments, amplitude adjustments, phase shift modulation scheme adjustments, etc.), control circuitry 42 can adjust the strength of the drive signals applied to each coil. A single selected coil may be used in transmitting power wirelessly from device 12 to device 10 or multiple coils 36 may be used in transmitting power. One or more devices 10 may receive wireless power and each of these devices may have one or more wireless power receiving coils that receive power from one or more corresponding wireless power transmitting coils.

Wireless power receiving device 10 has wireless power receiving circuitry 46. Circuitry 46 includes rectifier circuitry such as rectifier 80 (e.g., a synchronous rectifier controlled by signals from control circuitry 20) that converts received alternating-current signals from coil 14 (e.g., wireless power signals received by coil 14) into direct-current (DC) power signals for powering circuitry in device 10 such as load 100. Load circuitry such as load 100 may include battery 18, a power circuit such as a battery charging integrated circuit or other power management integrated circuit(s) that receives power from rectifier circuitry 80 and regulates the flow of this power to battery 18, and/or other input-output devices 22. Load circuitry 100 may contain a display, a touch sensor that overlaps the display, one or more touch sensors that are separate from the display, temperature sensors, accelerometers, pressure sensors, force sensors, compasses and gyroscopes, light-based proximity sensors and other proximity sensors, magnetic sensors, and/or other sensors, buttons, a keyboard, audio components such as speakers and microphones, integrated circuits for implementing control circuitry and communications circuitry (e.g., wireless communications circuitry), and/or other components. One or more capacitors C2 are used to couple coil 14 in input circuit 90 of device 10 to input terminals for rectifier circuitry 80. Rectifier circuitry 80 produces corresponding output power at output terminals that are coupled to load 100. If desired, load 100 may include sensor circuitry (e.g., current and voltage sensors) for monitoring the flow of power to load 100 from rectifier 80.

The properties (e.g., impedance) of each wireless power transmitting coil 36 in device 12 can be affected (e.g., increased) by the presence of overlapping coil(s) 14 and associated magnetic material (e.g., ferrite core material, etc.) in device 10. For example, the inductance L of one or more coils 36 can increase when device 10 is present in a position on the charging surface that overlaps those coils. The location(s) of coil(s) 14 can therefore be determined by making inductance measurements or other signal measurements on each of coils 36 and processing these measurements (e.g., using interpolation techniques, etc.).

During wireless power transmission operations, transistors in inverter 70 are driven by AC control signals from control circuitry 42. Control circuitry 42 uses measurement circuitry 102 to make measurements on coils 36 (e.g., to monitor the charging surface of device 12 for the presence of objects such as device 10 and/or incompatible foreign objects). Measurement circuitry 102 may be coupled to node N in output circuit 71 using path 104. Measurement circuitry 102 includes oscillatory circuitry that applies alternating-current probe signals while measuring corresponding signals on node N (e.g., to measure coil impedance and/or changes in coil impedance as the probe signal frequency is maintained at one or more fixed frequencies and/or is swept between first and second frequencies). If desired, measurement circuitry 102 can include impulse response circuitry. For impulse response measurements, control circuitry 42 uses inverter 70 to apply square wave impulse pulses or other impulses to each coil 36 while using impulse response measurement circuitry in circuitry 102 to make measurements on output circuit 71 (e.g., measurements on the inductance L of coil 36, measurements of quality factor Q, etc.).

Each coil 36 in device 12 (e.g., a coil such as coil 36 of FIG. 2 that has been selected by control circuitry 42 using multiplexing circuitry in wireless transmitter circuitry 34) has an inductance L. One or more capacitors in output circuit 71 such as capacitor 72 exhibit a capacitance C1 that is coupled in series with inductance L in output circuit 71. When supplied with alternating-current drive signals from inverter 70, the output circuit formed from coil 36 and capacitor 72 will produce alternating-current electromagnetic fields that are received by coil(s) 14 in device 10. The inductance L of each coil 36 is influenced by magnetic coupling with external objects, so measurements of inductance L for each coil 36 in device 12 can reveal information on device(s) 10 on the charging surface of device 12.

During impulse response measurements, circuitry 42 uses impulse response measurement circuitry 102 (sometimes referred to as inductance measurement circuitry and/or Q factor measurement circuitry) to perform measurements of inductance L and quality factor Q. Impedance measurements and other measurements with circuitry 102 may be initiated in response to detection of an external object on device 12 using a foreign object detection sensor (e.g., a sensor using coils 36 and/or other coils, a sensor using light-based sensing, capacitive based sensing, or other sensing techniques, etc.). Impedance measurements and other measurements with circuitry 102 may also be initiated in response to manual input, based on wirelessly received commands, etc. During the measurements, control circuitry 42 directs inverter 70 to supply one or more excitation pulses (impulses) to each coil 36, so that the inductance L and capacitance C1 of the capacitor 72 in the output circuit 71 that includes that coil 36 form a resonant circuit. The impulses may be, for example, square wave pulses of 1 µs in duration. Longer or shorter pulses and/or pulses of other shapes may be applied, if desired. The resonant circuit resonates at a frequency near to the normal wireless charging frequency of coil 36 (e.g., about 120 kHz, about 240 kHz, 100-500 kHz, 50-250 kHz, or other suitable wireless charging frequency) or may resonate at other frequencies.

Figure 3:
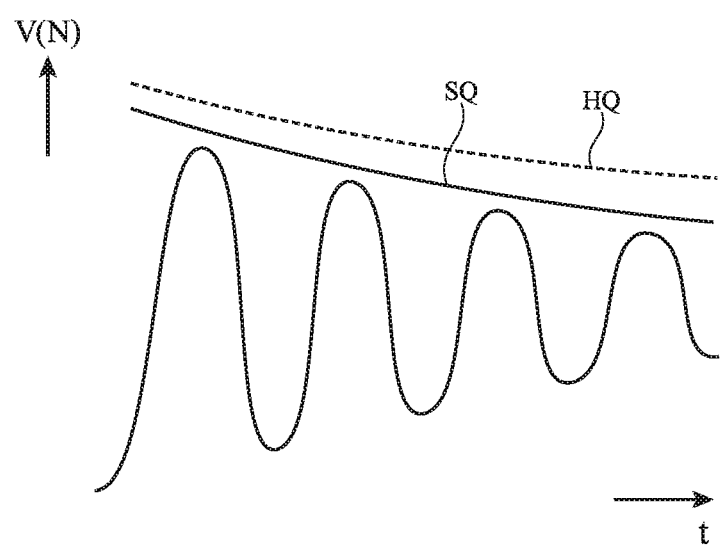
FIG. 3 is a graph of an illustrative impulse response to an applied impulse signal in a wireless charging system in accordance with an embodiment.

The impulse response (e.g., the voltage V(N) at node N of circuit 71) to the applied pulse(s) is as shown in FIG. 3. The frequency of the impulse response signal of FIG. 3 is proportional to $1/\sqrt{LC1}$, so L can be obtained from the known value of C1 and the measured frequency of the impulse response signal. Q may be derived from L and the measured decay of the impulse response signal. As shown in FIG. 3, if signal V(N) decays slowly, Q is high (e.g., HQ) and if signal V(N) decays more rapidly, Q is low (e.g., SQ). Measurement of the decay envelope of V(N) and frequency of V(N) of the impulse response signal of FIG. 3 with circuitry 102 will therefore allow control circuitry 42 to determine Q and L.

Figure 4:
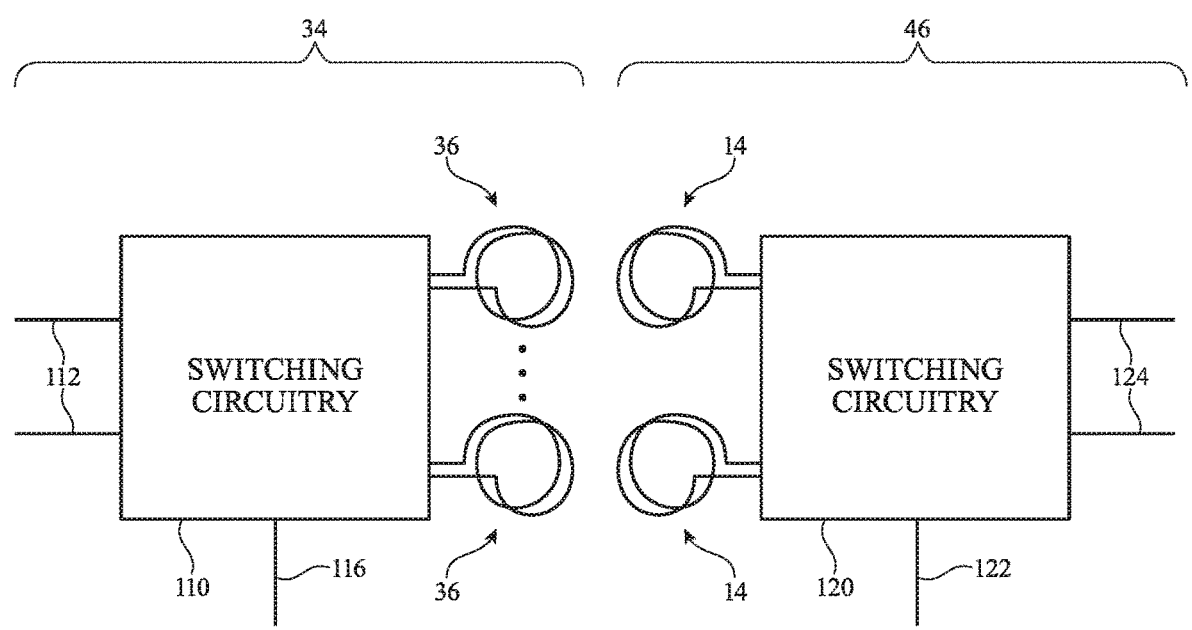
FIG. 4 is a diagram of illustrative wireless power transmitting and wireless power receiving circuitry in accordance with an embodiment.

FIG. 4 shows how wireless power transmitting circuitry 34 includes switching circuitry 110. Signals from inverter circuitry 70 are applied to switching circuitry 110 at input 112. Switching circuitry 110 forms part of wireless power transmitting circuitry 34 (sometimes referred to as inverter circuitry). Control signals applied to control input 116 by control circuitry 42 direct switching circuitry 110 to route the signals from input 112 to a selected one of coils 36 in an array of coils 36 in device 12. Wireless power receiving circuitry 46 of device 10 includes one or more coils 14. In configurations for device 10 that include multiple coils 14, coils 14 are coupled to switching circuitry 120. Control circuitry 20 applies control signals to control input 122 that direct switching circuitry 120 to route signals from a selected one of coils 14 to rectifier 80 via output terminals 124.

With one illustrative configuration for wireless transmitting device 12, wireless transmitting device 12 is a wireless charging mat or other wireless power transmitting equipment that has an array of coils 36 that supply wireless power over a wireless charging surface (e.g., coils 36 are arranged in a two-dimensional array that lie in a planar housing such as a housing associated with a wireless charging mat. In this type of configuration, coils 36 of device 12 are covered by a planar dielectric structure such as a plastic member or other structure forming a charging surface. The lateral dimensions (X and Y dimensions in an arrangement in which the coils lie in an X-Y plane) of the array of coils 36 in device 36 may be 1-1000 cm, 5-50 cm, more than 5 cm, more than 20 cm, less than 200 cm, less than 75 cm, or other suitable size. Coils 36 may overlap on the charging surface or may be arranged on the charging surface in a non-overlapping configuration. Coils 36 can be placed in a rectangular array having rows and columns and/or may be tiled using a hexagonal tile pattern, a pattern with square tiles, or other pattern.

Figure 5:
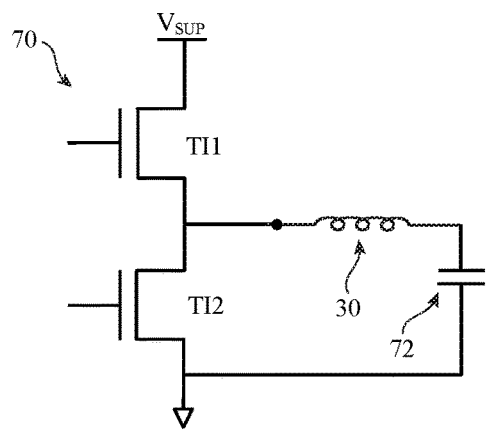
FIG. 5 is a circuit diagram of an illustrative wireless charging system output circuit with an inverter coupled to one or more coils in an array of coils in accordance with an embodiment.
Figure 6:
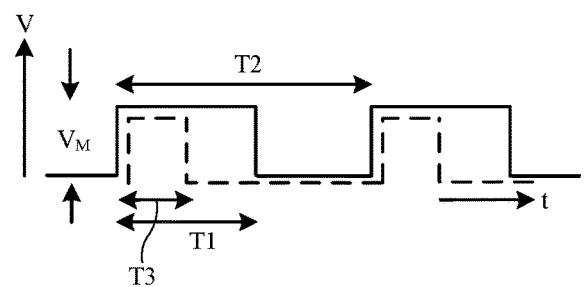
FIG. 6 is a graph of illustrative signals associated with operation of the circuit of FIG. 5 in accordance with an embodiment.
Figure 7:
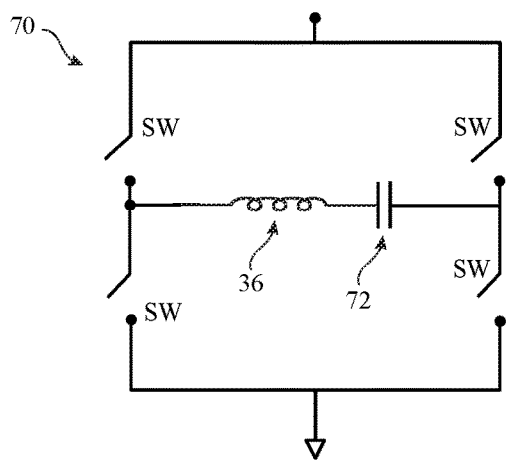
FIG. 7 is a circuit diagram of another illustrative wireless charging system output circuit with an inverter coupled to one or more coils in an array of coils in accordance with an embodiment.
Figure 8:
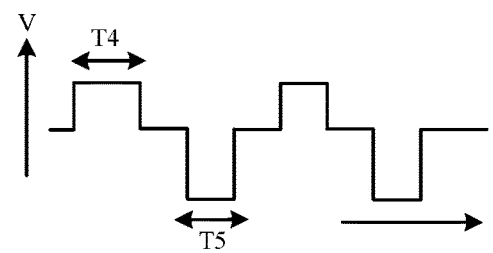
FIG. 8 is a graph of illustrative signals associated with operation of the circuit of FIG. 5 in accordance with an embodiment.

System 8 can support one or more wireless power modulation schemes. Illustrative output circuitry (see, e.g., output circuitry 71 of FIG. 2) for device 12 to support pulse-width modulation (PWM) and amplitude modulation (AM) power modulation schemes is shown in FIG. 5. The output circuitry of FIG. 5 includes inverter 70. Inverter 70 has transistors TI1 and TI2 that supply alternating-current drive signals such as the square wave pulses of FIG. 6 onto coil 36 and capacitor 72. As shown in FIG. 6, in PWM modulation schemes, control circuitry 42 adjusts the control signals supplied to the gates of transistors TI1 and TI2 in inverter 70 to vary the duty cycle (pulse width) of the control signals (e.g., to duty cycle T1/T2 in a high duty cycle scenario or to duty cycle T3/T2 in a low duty cycle scenario). In amplitude modulation schemes, control circuitry 42 adjust the magnitude of supply voltage Vsup to inverter 70, thereby adjusting the corresponding magnitude (amplitude) Vm of the drive signals supplied by inverter 70 to coil 36 and capacitor 72. If desired, system 8 can support a phase modulation scheme by incorporating output circuitry such as inverter 70 of FIG. 7 into device 12. In this configuration, control circuitry 42 adjusts switches SW (e.g., power field-effect transistors) to supply a phase-modulated drive signal to coil 36 and capacitor 72, as shown by the illustrative drive signal of FIG. 8. Control circuitry 42 adjust the magnitude of time periods T4 and T5 to control the amount of power transfer to device 10 from device 12. Phase-modulated power transfer schemes produce fewer signal harmonics during power transfer operations but are generally less efficient than PWM schemes (e.g., at lower power transfer levels). Output circuitry of the type shown in FIGS. 5 and 7 and/or other output circuitry controlled by control circuitry 42 is included in device 12 so that device 12 supports multiple different modulation schemes (e.g., PWM, AM, phase modulation, etc.).

A user may have multiple devices 10 each of which has different charging requirements. For example, some devices may have batteries that are fully charged and other devices may have depleted batteries. Some devices may have large maximum power transfer capabilities and other devices may have only modest power transfer capabilities. Sensitive devices may be operating in some devices (e.g., wireless communications circuitry that is sensitive to radio-frequency interference, sensitive components such as a touch sensor in a display, display driver circuitry in a display, etc.) while other devices may be sleeping or may not contain any currently operating sensitive devices. Due to these various operating conditions, system 8 negotiates optimum operating settings for device 12 and/or device 10 (e.g., during set-up when device 10 is first receiving power and/or at other times during the operation of system 8). Wireless power transfer settings information is determined by device 12 using measurement circuitry 102 (e.g., to detect device 10, to measure coil inductance L, etc.) and/or using wireless communications circuitry 58 to communicate wirelessly with wireless communications circuitry 56 (e.g., so that wireless power transmitting device 12 can provide wireless power receiving device 10 with a list of available wireless power transmission capabilities for the transmitting device and so that wireless power receiving device 10 can, after analyzing these capabilities and information on the current operating environment of device 10, provide device 12 with corresponding selected power transmission settings).

Conditions that affect optimum power transmission settings include the current operating temperature for device 10, battery charge level, and sensitive component operating states (e.g., whether a touch screen display, wireless communications circuit, or other component that is sensitive to radio-frequency interference is currently operating). Adjustable wireless power transmission settings that may be adjusted in device 12 include the frequency of the drive signals applied to coil 36 by inverter 70, duty cycle settings such as the minimum and maximum duty cycle associated with the drive signals, drive signal amplitude, modulation scheme (e.g., PWM, AM, or phase shift), maximum transmitted power, sleep timer period (e.g., a wireless power transmission sleep timer setting that determines a period of time after which device 12 awakes from sleep to restart wireless power transmission operations with device 10, sometimes referred to as a restart interval or wireless power transmission sleep timer interval), and other settings associated with the transmission of wireless power in system 8. Device 12 can advertise its capabilities to device 10 (e.g., by transmitting information on wireless power transmission capabilities for device 12 to device 10) and device 10 can analyze its current operating conditions (temperature, list of active components, battery charge level, etc.) to select from among these capabilities (e.g., to select an optimum charging frequency, modulating scheme, duty cycle settings, maximum transmitted power level, etc.). Device 10 can then transmit these selected settings to device 10 to use in transmitting wireless power to device 10.

Consider, as an example, a scenario in which device 10 is a cellular telephone with an active sensitive component such as a touch screen display. The touch screen display (in this example) is sensitive to interference from 140 kHz noise. When device 10 asks device 12 to advertise its power transmission capabilities, device 12 informs device 10 that its only available wireless power transmission frequency is 140 kHz. Because this is the only available wireless power transmission frequency, device 10 accepts this wireless power transmission frequency (e.g., device 10 informs device 12 to proceed with wireless power transmission operations at 140 kHz), but also directs device 12 to limit transmitted power to less than 3 W (e.g., device 10 provides device 12 with a selected maximum transmit power setting), which is lower than the cellular telephone's power receiving capability (e.g., of 10 W). Because power transmission is restricted in this way, wireless interference from device 12 will be maintained at acceptable levels and the touch screen display of device 12 will not be adversely affected during wireless power transmission operations.

If, on the other hand, device 10 is a wristwatch device with a touch screen display that is currently not active, device 10 can instruct device 12 to proceed to transmit at the maximum power reception capability of device 10 (e.g., 5 W).

Anther possible scenario involves an arrangement in which device 12 supports wireless power transmission at a range of frequencies (e.g., at least two frequencies). In this arrangement, device 12 informs device 10 that frequencies from 100-200 kHz are available and device 10 choses from these frequencies based on information such as information on which (if any) sensitive components in device 10 are operating. As an example, a receiving device such as a cellular telephone with an active sensitive device such as a touch screen display or wireless communication circuit that is sensitive to interference at 120 kHz (whether directly at this frequency or because this transmitted frequency is associated with interfering harmonic frequencies), may direct device 12 to transmit wireless power using a frequency of 128 kHz (which is different than 120 kHz) at a maximum power transmission level of 5 W (which is somewhat reduced from the maximum wireless power reception capability of device 10 of 10 W).

Duty cycle settings can likewise be established to enhance wireless power transfer performance. Large duty cycle values may be associated with potentially high amounts of transmitted power. If device 10 is a device with low power reception capabilities, device 10 can direct device 12 to use a maximum duty cycle setting of 30% (as an example) to prevent scenarios in which too much power is transmitted. If device 10 is in need of power to operate (e.g., because device 10 has a fully depleted battery), device 10 can instruct device 12 to use a minimum duty cycle setting of 5% (as an example) to ensure that sufficient power is wirelessly transmitted from device 12 to device 10 to allow device 10 to operate its components while the battery in device 10 is being replenished.

Device 12 operates in a normal (wake) mode in which wireless power is being transmitted from device 12 to device 10 and, when power is not being wirelessly transmitted (e.g., because device 10 contains a battery that is fully charged), one or more coils 36 can enter a sleep mode. In the sleep mode, power consumption is reduced, because operations such as wireless power transmission operations and coil measurement operations with measurement circuit 102 are temporarily halted (inverter 70 does not supply drive signals to coil 36). A sleep timer is active during sleep mode. The sleep timer runs to a sleep timer interval (e.g., 30 seconds or other sleep time period, sometime referred to as a reset timer setting or sleep timer setting). When the sleep timer expires (e.g., when the sleep time setting is reached by a sleep timer implemented with control circuitry 42), device 12 (e.g., one or more coils 36) wakes up from sleep mode and is again available to wirelessly communicate with device 10 and wirelessly transmit power to device 10.

The value of the sleep timer setting can be adjusted (e.g., to a value of 1 ms to 10 minutes, more than 1 ms, more than 1 s, more than 10 s, more than 100 s, more than 1 minute, more than 10 minutes, less than 10 minutes, less than 1 minute, 1-10 minutes, less than 10 s, 10-1000 s, less than 1 s, etc.). Device 10 can select an appropriate sleep time based on its status when charging is complete (e.g., based on its battery capacity, battery charge level, bias current level, operating temperature, etc.). If, for example, device 10 is a device with a relatively small battery, device 10 may direct device 12 to set the sleep timer to 1 minute. With this setting, after the battery in device 10 is charged, device 12 wakes up every 1 minute to check with device 10 (e.g., over a wireless communications link between device 10 and device 12) to check with device 10 whether more power is needed by device 10. If more power is needed, device 12 wirelessly transmits power to device 10. If more power is not needed, device 12 returns to sleep. If, as another example, device 10 is a device with a relatively large battery, device 10 may direct device 12 to set the sleep timer of device 10 a longer time period (e.g., 5 minutes). Because the battery in device 10 (in this example) is larger, the battery can sustain a longer period of time without being refreshed by power transmission from device 12.

In this way, if a user places device 10 onto device 12 for an extended period of time relative to the amount needed to fully charge device 10 (e.g., device 10 is left on device 12 for days), device 12 can sleep after fully charging device 10, and periodically awake to see whether the battery level of device 10 requires further charging in an efficient manner.

As described in connection with FIGS. 5-8, system 8 may support multiple different power transmission modulation schemes. During set-up operations in which device 10 and device 12 are communicating over a wireless communications link or at other suitable times, device 12 informs device 10 of the modulation schemes supported by device 12. Device 10 selects appropriate modulation scheme(s) based on the available schemes and based on current operating conditions for device 10 (operating temperature measured with a temperature sensor, battery charge level, information on which components in device 10 are currently active, etc.). As an example, if device 12 informs device 10 that device 12 only supports a PWM power transfer modulation scheme, device 10 can direct device 12 to use this scheme in wirelessly transferring power to device 10. If, as another example, device 12 informs device 10 that device 12 supports both AM and PWM schemes and device 10 has a partially charged battery, device 10 can provide device 12 with wireless power transmission modulation scheme settings information (e.g., one or more modulation schemes and one or more associated power threshold settings) that directs device 12 to use an AM power transfer modulation scheme to help rapidly charge the battery. In directing device 12 to use the AM scheme, device 10 can inform device 12 to use the AM scheme so long as the power consumed by load 100 is greater than a threshold amount (e.g., 3 W) and to drop back to PWM for enhanced power transfer efficiency once the power consumed by load 100 is less than 3 W. By providing device 12 with power modulation scheme settings such as these or other suitable power modulation scheme settings information, device 10 can configure system 8 for optimum power transfer (e.g., based on sensor data, battery charge level, information on currently active components, based on the capabilities of device 12, etc.).

Another example related to adjustable power transfer settings involves temperature measurements with a temperature sensor in components 100 of device 10. If operating temperature is measured to be low, device 10 can direct device 12 to provide device 10 with wireless power using a PWM scheme (as an example). Phase-modulation schemes may generate fewer signal harmonics and fewer eddy currents in conductive structures in device 10 that can raise the temperature of device 10. Accordingly, if operating temperature of device 10 is high, device 10 can direct device 12 to supply wireless power using a phase-shifted wireless power transfer modulation scheme. Phase-shifted modulation can also be favored in situations in which sensitive components are operating device 10.

Figure 9:
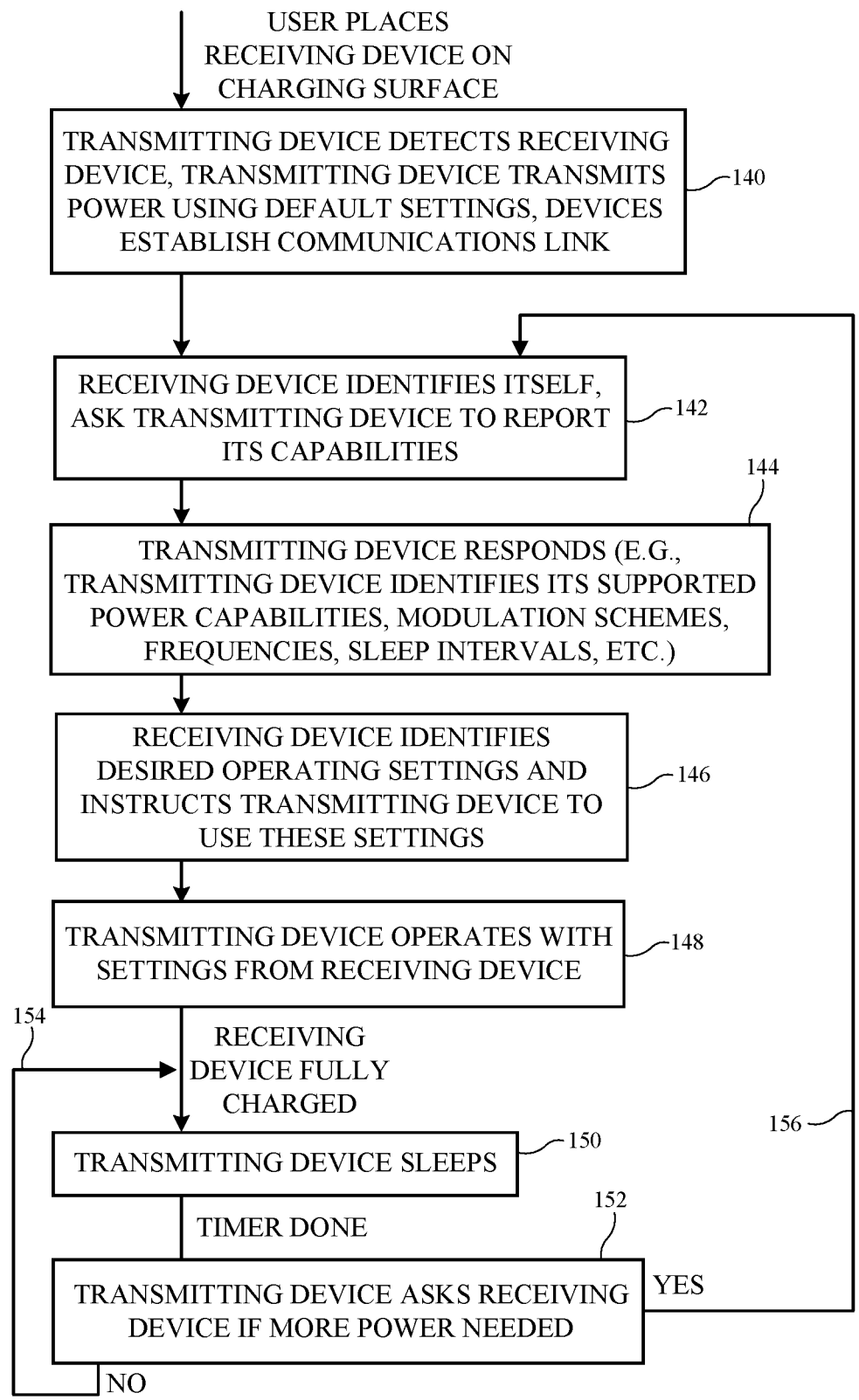
FIG. 9 is a flow chart of illustrative operations involved in using a wireless charging system in accordance with an embodiment.

A flow chart of illustrative operations involved in using system 8 is shown in FIG. 9. Device 12 may use measurement circuitry 102 and/or other detection circuitry to monitor for the presence of devices 10 that can receive wireless power. If a user places device 10 on the charging surface of device 12, device 12 can detect device 10 (block 140). Device 12 may, as an example, detect a change in the impedance of one or more of coils 36, may detect an inductance on one or more of coils 36 that is elevated relative to adjacent coils 36 using an impulse-response measurement circuit, or may otherwise sense that device 10 is present on device 12. In response to detecting the presence of a device that appears to be compatible with wireless charging, device 12 can begin transmitting wireless power to device 10. During these power transmission operations, device 12 can use default power transmission settings (e.g., relatively low power settings) to help power device 10 sufficiently for device 10 to use its wireless communications circuitry in the event that device 10 contains a depleted battery. Device 12 and device 10 can then establish a wireless communications link using circuitry 56 and 58 (FIG. 1). If desired, device 12 can attempt to establish a wireless communications link with device 10 before transmitting power to device 10.

During the operations of block 142, device 10 may, if desired, identify itself to device 12 (e.g., with a serial number, model number, information on operating limits, etc.). Device 10 can also provide device 12 with a request that asks device 12 to supply device 10 with a list of its capabilities.

During the operations of block 144, device 12 responds to the request of block 142 that asks device 12 to transmit information on the wireless power transfer capabilities of device 12 to device 10. As an example, device 12 can transmit information to device 10 that informs device 10 of the supported duty cycle range of device 10 or other supported duty cycle settings, the supported range of wireless power transfer frequencies (for the drive signal from inverter 70), the supported wireless power transfer modulation schemes (e.g., PWM, AM, phase-shifted, and/or other wireless power transfer modulation scheme settings), the supported power transmission range (e.g., minimum power level and/or maximum power level), and/or other wireless power transmission capabilities of device 12.

During the operations of block 146, device 10 processes information from sensors in load 100 (e.g., temperature information from a temperature sensor, and/or other sensor information), information on which components in device 10 are operating (e.g., whether sensitive components such as a touch insensitive or touch sensitive display, touch sensor (e.g., a stand-alone touch sensor or a touch sensor in a touch sensitive display), wireless communications circuitry, or other components in device 10 that are potentially sensitive to disruption by radio-frequency signals generated during wireless power transmission, information on the current charge level of the battery in device 10 and/or other information on the current operating environment of device 10 and processes information from device 12 on the wireless power transmission capabilities of device 12 to determine appropriate settings for use in wireless power transfer operations. Device 10 may, as an example, determine desired settings based on potentially competing criteria such as criteria related to minimized interference, reduced charging time, maximized safety (e.g., reduced likelihood of circuit degradation with reduced power transmission levels), enhanced power efficiency, minimized signal harmonics (e.g., when using phase-shift modulation instead of PWM to help reduce eddy currents that might heat device 10), minimized user wait time, enhanced user expectations, and/or other criteria. After determining settings to use for wireless power transfer operations, device 10 transmits instructions to device 12 that contain the appropriate wireless power transfer settings information. The settings may include minimum and/or maximum duty cycle settings, frequency settings, a sleep timer setting, minimum and/or maximum power transfer level settings, modulation scheme settings (including, if desired, associated power transfer level thresholds associated with different modulation schemes) and/or other settings. The instructions direct device 12 to use these wireless power transfer settings in transferring power wirelessly to device 10.

During the operations of block 148, device 12 transfers power wirelessly to device 10 using the settings information received from device 10 at block 148. When device 10 is fully charged, device 10 can wirelessly transmit information to device 12 that directs device 12 to stop wireless power transfer operations and to enter a low-power sleep mode. In response, device 12 sleeps for an amount of time that is specified by a sleep timer setting (e.g., a sleep interval of 1 minute, 5 minutes, more than 5 minutes, less than 5 minutes, etc.) to conserve power (block 150). The sleep timer setting may be established using a default setting and/or a setting received from device 10 (e.g., at step 146). When the sleep timer expires (e.g., when the sleep time has reached the sleep timer setting), device 12 awakes from its sleep state and transmits a request to device 10 wirelessly that asks device 10 whether more power is needed to recharge the battery in device 10 and/or to power components in device 10 (block 152). If no more power is needed by device 10, device 12 can return to the sleep state and, as indicated by line 154, control can loop back to block 150. If, additional power is needed, processing can loop back to block 142, as indicated by line 156.

The foregoing is illustrative and various modifications can be made to the described embodiments. The foregoing embodiments may be implemented individually or in any combination.

What is claimed is:

1. A wireless power transmitting device having a charging surface configured to receive a wireless power receiving device, wherein the wireless power receiving device has a wireless power receiving coil configured to receive wireless power signals from the wireless power transmitting device, the wireless power transmitting device comprising:
   a wireless power transmitting coil;
   inverter circuitry coupled to the wireless power transmitting coil, wherein the inverter circuitry is configured to supply a drive signal to the wireless power transmitting coil to produce the wireless power signals;
   measurement circuitry coupled to the wireless power transmitting coil to detect when the wireless power receiving device is present; and
   control circuitry configured to:
      detect that the wireless power receiving device is present on the charging surface using the measurement circuitry;
      in response to detecting that the wireless power receiving device is present on the charging surface, establish a wireless communications link with the wireless power receiving device; and
      wirelessly receive a wireless power transmission sleep timer setting over the wireless communications link.

2. The wireless power transmitting device defined in claim 1 wherein the control circuitry is further configured to:
   wirelessly transmit information on wireless power transmission capabilities of the wireless power transmitting device over the wireless communications link, wherein the wirelessly received wireless power transmission sleep timer setting is selected by the wireless power receiving device based on the transmitted information on the wireless power transmission capabilities.

3. The wireless power transmitting device defined in claim 2 wherein the transmitted information on the wireless power transmission capabilities includes at least one wireless power transmission frequency for use in providing the drive signal to the wireless power transmitting coil with inverter and wherein the control circuitry is further configured to:
   wirelessly receive a wireless power transmission frequency setting over the wireless communications link, wherein the wirelessly received wireless power transmission frequency setting is selected by the wireless power receiving device based on the transmitted information on the wireless power transmission capabilities.

4. The wireless power transmitting device defined in claim 2 wherein the transmitted information on the wireless power transmission capabilities includes information on at least one wireless power transmission modulation scheme and wherein the control circuitry is further configured to:
   wirelessly receive a wireless power transmission modulation scheme setting over the wireless communications link, wherein the wirelessly received wireless power transmission modulation scheme setting is selected by the wireless power receiving device based on the transmitted information on the wireless power transmission capabilities.

5. The wireless power transmitting device defined in claim 4 wherein the wireless power transmission modulation scheme setting comprises a wireless power transmission modulation scheme setting selected from the group consisting of: a pulse-width modulation scheme setting, an amplitude modulation scheme setting, and a phase shift modulation scheme setting.

6. The wireless power transmitting device defined in claim 2 wherein the transmitted information on the wireless power transmission capabilities includes: information on a wireless power transmission pulse-width modulation scheme, a wireless power transmission amplitude modulation scheme setting, and a wireless power transmission phase shift modulation scheme setting.

7. The wireless power transmitting device defined in claim 1 wherein the control circuitry is further configured to wirelessly receive wireless power transmission duty cycle settings over the wireless communications link.

8. The wireless power transmitting device defined in claim 1 wherein the measurement circuitry comprises impulse response measurement circuitry and wherein the control circuitry is configured to detect that the wireless power receiving device is present on the charging surface by using the measurement circuitry to measure a coil inductance associated with the wireless power transmitting coil.

9. A wireless power transmitting device having a charging surface configured to receive a wireless power receiving device, wherein the wireless power receiving device has a wireless power receiving coil configured to receive wireless power signals from the wireless power transmitting device, the wireless power transmitting device comprising:
   a wireless power transmitting coil;
   inverter circuitry coupled to the wireless power transmitting coil, wherein the inverter circuitry is configured to supply a drive signal to the wireless power transmitting coil to produce the wireless power signals;
   measurement circuitry coupled to the wireless power transmitting coil to detect when the wireless power receiving device is present; and
   control circuitry configured to:
      detect that the wireless power receiving device is present on the charging surface using the measurement circuitry;
      in response to detecting that the wireless power receiving device is present on the charging surface, establish a wireless communications link with the wireless power receiving device; and wirelessly receive a wireless power transmission modulation scheme setting over the wireless communications link.

10. The wireless power transmitting device defined in claim 9 wherein the wireless power transmission modulation scheme comprises a wireless power transmission modulation scheme selected from the group consisting of:

a pulse-width modulation scheme setting, an amplitude modulation scheme setting, and a phase shift modulation scheme setting.

11. The wireless power transmitting device defined in claim 10 wherein the measurement circuitry comprises impulse response measurement circuitry and wherein the control circuitry is configured to detect that the wireless power receiving device is present on the charging surface by using the measurement circuitry to measure a coil inductance associated with the wireless power transmitting coil.

12. The wireless power transmitting device defined in claim 11 wherein the control circuitry is further configured to:

wirelessly transmit information on wireless power transmission capabilities of the wireless power transmitting device over the wireless communications link, wherein the wirelessly received wireless power transmission modulation scheme setting is selected by the wireless power receiving device based on the transmitted information on the wireless power transmission capabilities.

13. The wireless power transmitting device defined in claim 12 wherein the control circuitry is further configured to wirelessly receive a wireless power transmission duty cycle setting from the wireless power receiving device over the wireless communications link.

14. The wireless power transmitting device defined in claim 12 wherein the control circuitry is further configured to wirelessly receive a wireless power transmission sleep timer setting from the wireless power receiving device over the wireless communications link.

15. A wireless power transmitting device having a charging surface configured to receive a wireless power receiving device, wherein the wireless power receiving device has a wireless power receiving coil configured to receive wireless power signals from the wireless power transmitting device, the wireless power transmitting device comprising:

a wireless power transmitting coil;

inverter circuitry coupled to the wireless power transmitting coil, wherein the inverter circuitry is configured to supply a drive signal to the wireless power transmitting coil to produce the wireless power signals;

measurement circuitry coupled to the wireless power transmitting coil to detect when the wireless power receiving device is present;

control circuitry configured to:

detect that the wireless power receiving device is present on the charging surface using the measurement circuitry;

in response to detecting that the wireless power receiving device is present on the charging surface, establish a wireless communications link with the wireless power receiving device; and wirelessly receive minimum and maximum duty cycle wireless power transmission settings over the wireless communications link.

16. The wireless power transmitting device defined in claim 15 wherein the control circuitry is further configured to:

wirelessly transmit information on wireless power transmission capabilities of the wireless power transmitting device over the wireless communications link, wherein the minimum and maximum duty cycle wireless power transmission settings comprise wireless power transmitting settings selected by the wireless power receiving device based on the transmitted information on the wireless power transmission capabilities.

17. The wireless power transmitting device defined in claim 16 wherein the transmitted information on the wireless power transmission capabilities includes a wireless power transmission frequency setting for the inverter to provide the drive signal to the wireless power transmitting coil and wherein the control circuitry is further configured to:

wirelessly receive the wireless power transmission frequency setting over the wireless communications link.

18. The wireless power transmitting device defined in claim 16 wherein the transmitted information on the wireless power transmission capabilities includes a wireless power transmission modulation scheme setting for use in providing the drive signal to the wireless power transmitting coil with the inverter and wherein the control circuitry is further configured to:

wirelessly receive the wireless power transmission modulation scheme setting over the wireless communications link.

19. The wireless power transmitting device defined in claim 16 wherein the transmitted information on the wireless power transmission capabilities includes a wireless power transmission sleep timer setting for the control circuitry and wherein the control circuitry is further configured to:

wirelessly receive the wireless power transmission sleep timer setting over the wireless communications link.

20. The wireless power transmitting device defined in claim 15 wherein the measurement circuitry comprises impulse response measurement circuitry and wherein the control circuitry is configured to detect that the wireless power receiving device is present on the charging surface by using the measurement circuitry to measure a coil inductance associated with the wireless power transmitting coil.

* * * * *